US009156392B2

(12) United States Patent
Whiteford

(10) Patent No.: US 9,156,392 B2
(45) Date of Patent: Oct. 13, 2015

(54) ADJUSTABLE SUPPORT STRUCTURE FOR VEHICLE CARGO BED EXTENSION

(76) Inventor: Barry Whiteford, Canton, NY (US)

(*) Notice: Subject to any disclaimer, the term of this patent is extended or adjusted under 35 U.S.C. 154(b) by 0 days.

(21) Appl. No.: 13/407,367

(22) Filed: Feb. 28, 2012

(65) Prior Publication Data
US 2012/0217766 A1  Aug. 30, 2012

Related U.S. Application Data

(60) Provisional application No. 61/447,613, filed on Feb. 28, 2011, provisional application No. 61/553,624, filed on Oct. 31, 2011.

(51) Int. Cl.
B60P 3/40 (2006.01)
B62C 1/06 (2006.01)

(52) U.S. Cl.
CPC .... B60P 3/40 (2013.01); B62C 1/06 (2013.01)

(58) Field of Classification Search
USPC ............. 296/26.08, 26.11; 414/462; 224/402, 224/403, 405
See application file for complete search history.

(56) References Cited

U.S. PATENT DOCUMENTS

| 2,947,566 | A | * | 8/1960 | Pierce Tower | 296/10 |
|---|---|---|---|---|---|
| 3,801,086 | A | * | 4/1974 | Raidel | 267/67 |
| 3,855,946 | A | * | 12/1974 | Bales | 108/147.21 |
| 5,451,088 | A | * | 9/1995 | Broad | 296/26.08 |
| 5,567,107 | A | * | 10/1996 | Bruno et al. | 414/462 |
| 5,615,813 | A | | 4/1997 | Ouellette | |
| 5,685,686 | A | * | 11/1997 | Burns | 414/462 |
| 5,782,514 | A | * | 7/1998 | Mann | 293/118 |
| 5,938,395 | A | * | 8/1999 | Dumont, Jr. | 414/462 |
| 6,070,926 | A | | 6/2000 | Hardin | |
| 6,139,247 | A | * | 10/2000 | Wright | 414/462 |
| 6,604,658 | B1 | | 8/2003 | Young et al. | |
| 6,648,391 | B1 | * | 11/2003 | Whiteford et al. | 296/26.08 |
| 6,877,505 | B1 | * | 4/2005 | Den Hoed | 126/276 |
| 6,991,277 | B1 | * | 1/2006 | Esler | 296/50 |
| 7,811,045 | B2 | * | 10/2010 | Butta | 414/462 |
| 2003/0127879 | A1 | * | 7/2003 | Smith | 296/57.1 |
| 2011/0024473 | A1 | | 2/2011 | Weiss | |

OTHER PUBLICATIONS

International Search Report/Written Opinion for PCT Application No. PCT/US2012/026958; mailed Sep. 24, 2012; 8 pages.

* cited by examiner

Primary Examiner — Dennis H Pedder
(74) Attorney, Agent, or Firm — Kenneth J. Lukacher Law Group; R. S. Rosenholm

(57) ABSTRACT

This invention relates to an apparatus, system and method for adjustable support of an extension of a vehicle cargo bed. The apparatus provides a range of horizontal, vertical, diagonal and angular adjustment of a vehicle cargo bed extension deck so as to accommodate a wide variety of differently designed and dimensioned vehicles and provides other features promoting reliability and safety while minimizing unwanted vibration during use.

31 Claims, 16 Drawing Sheets

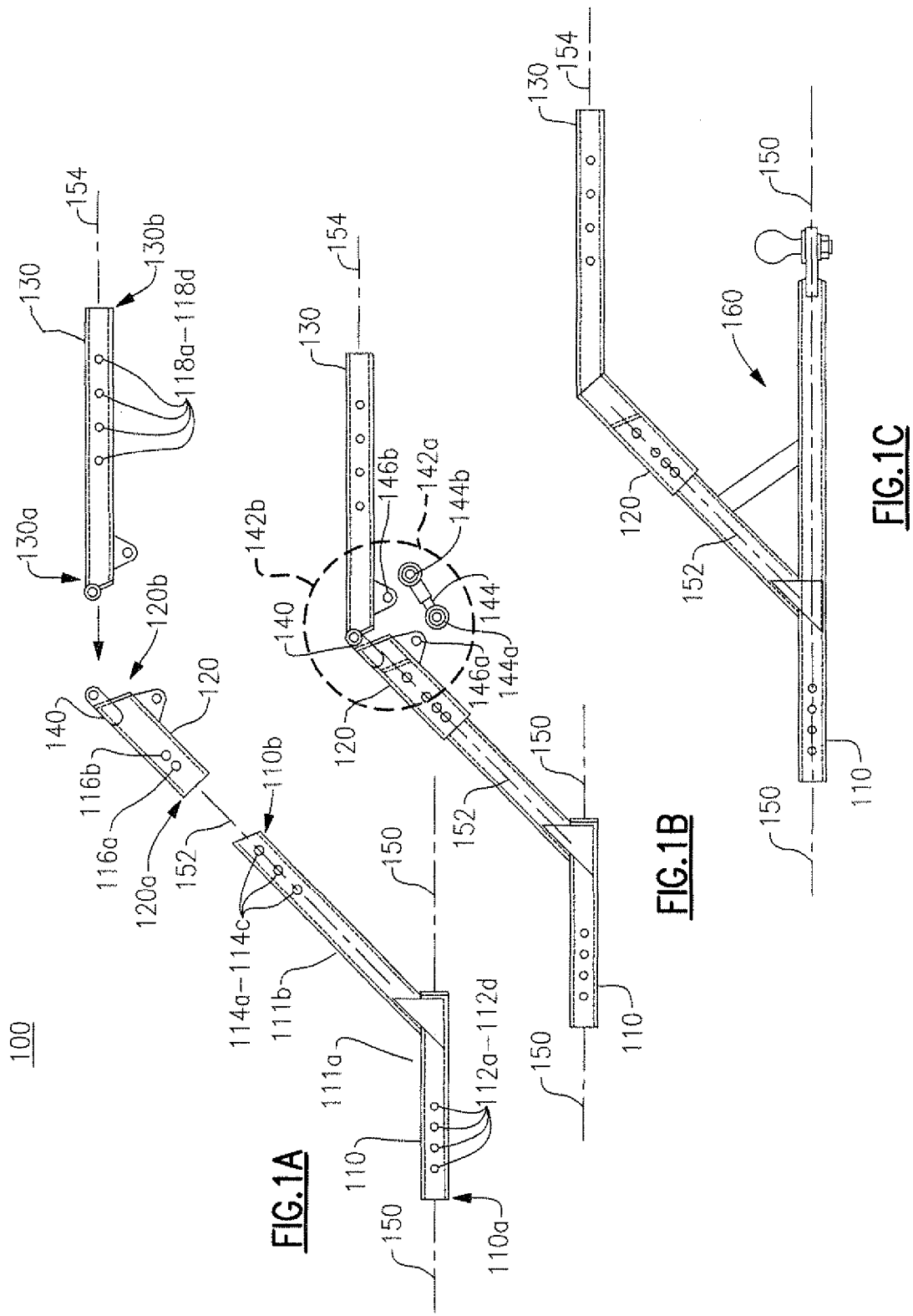

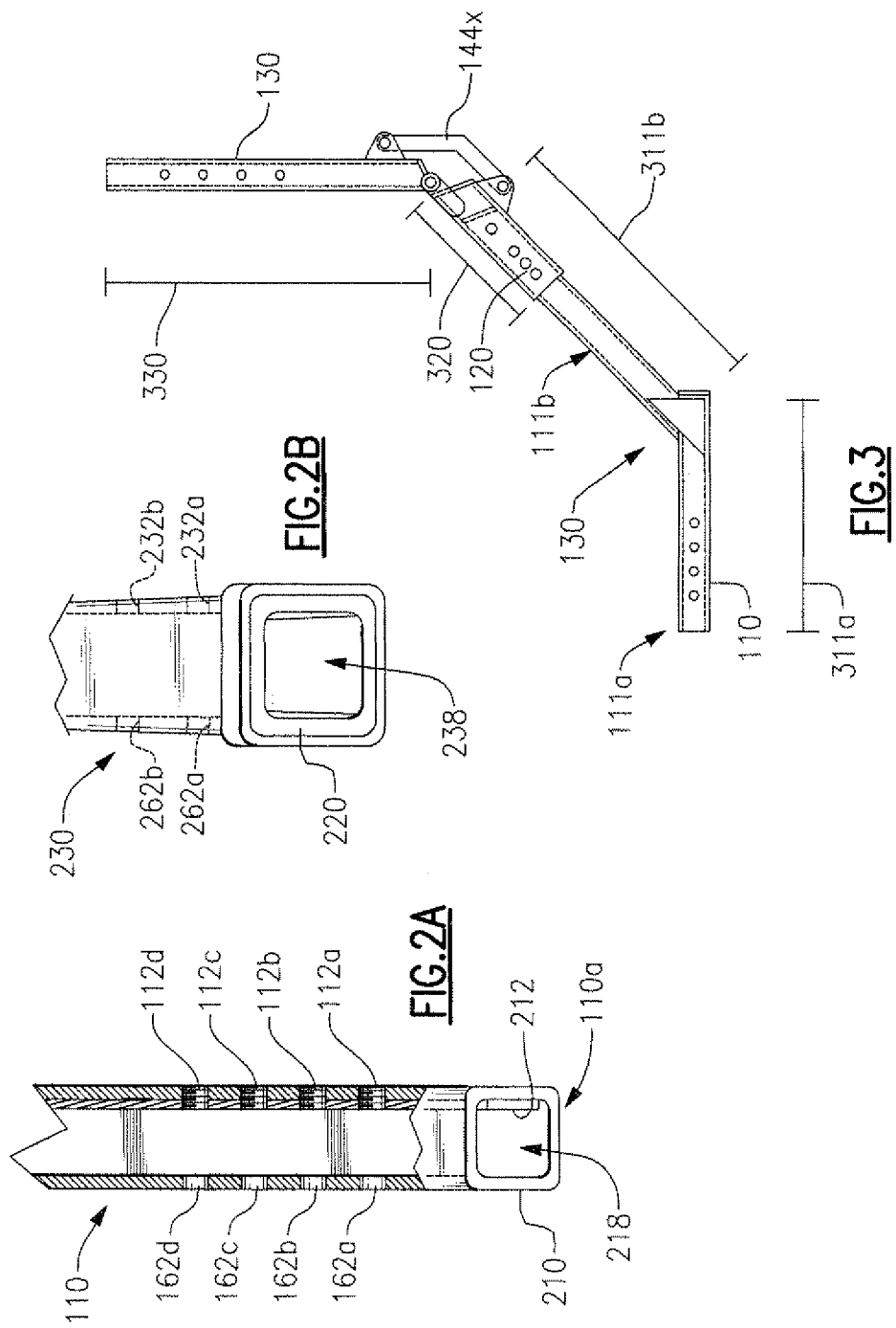

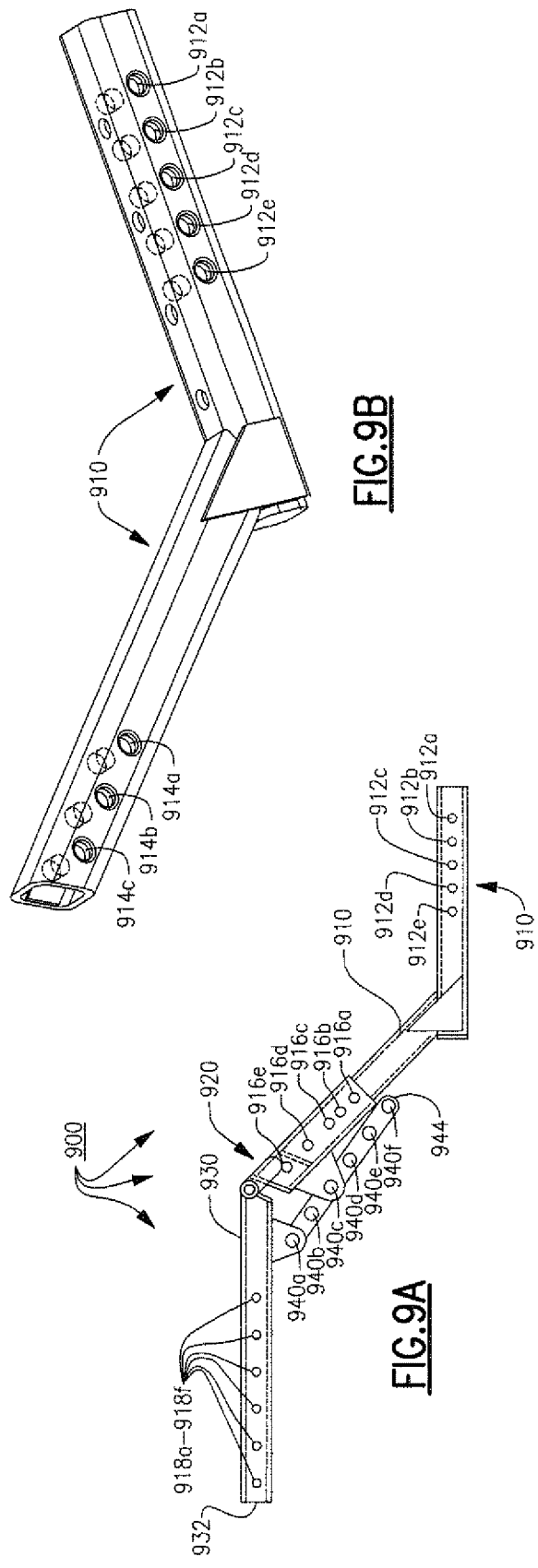

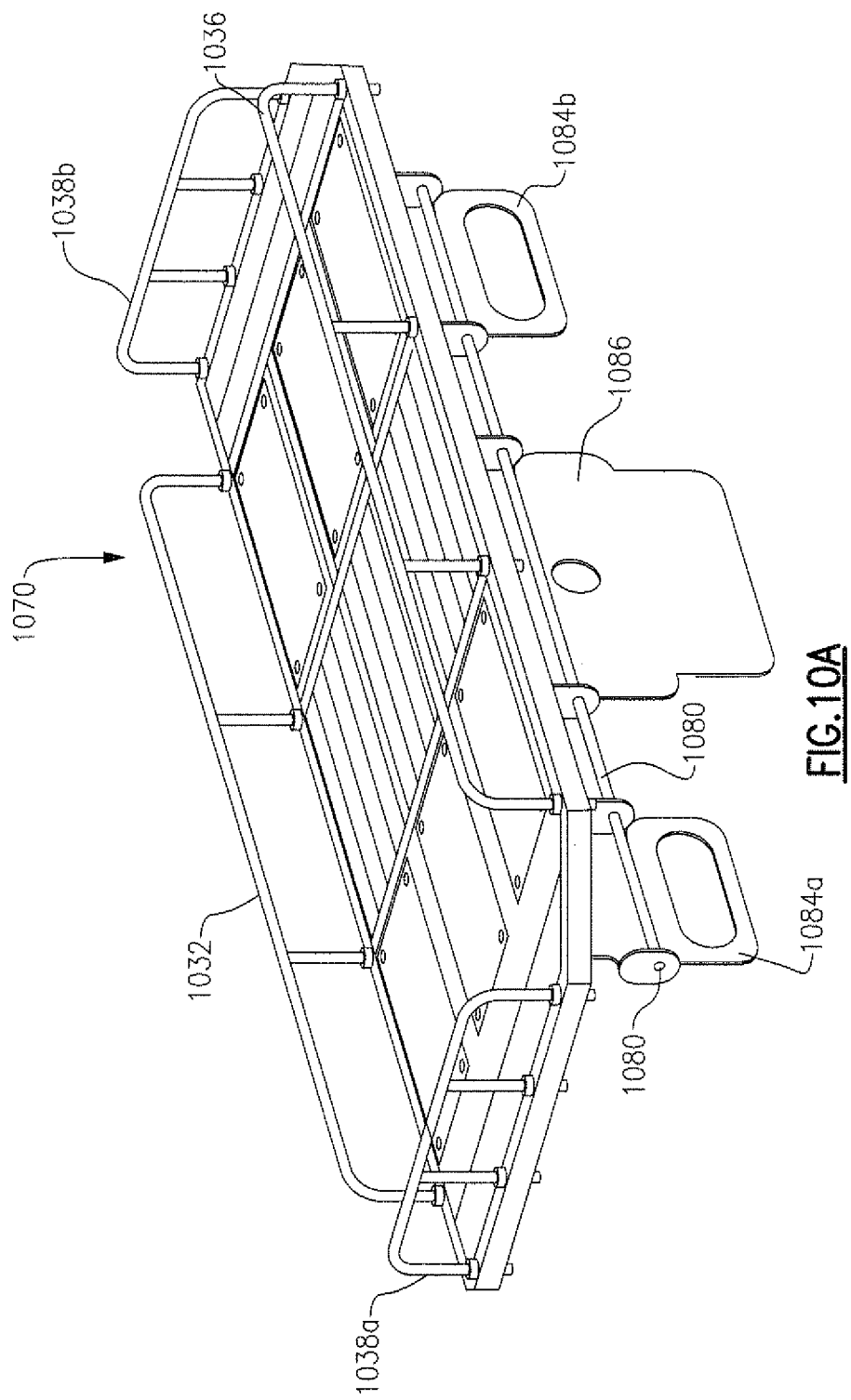

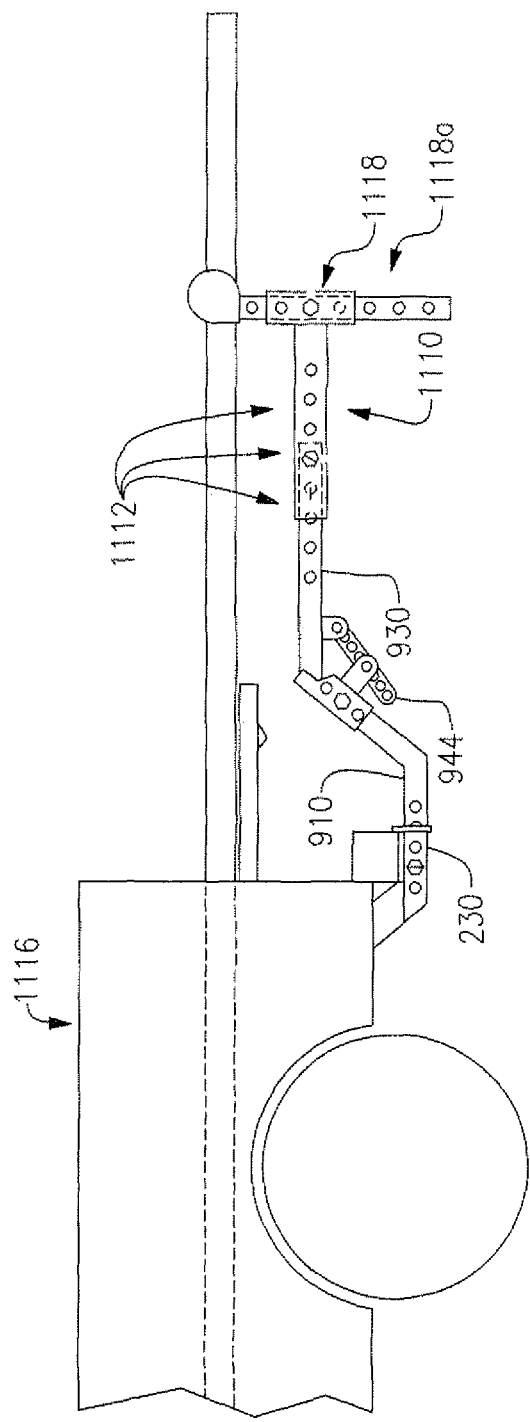

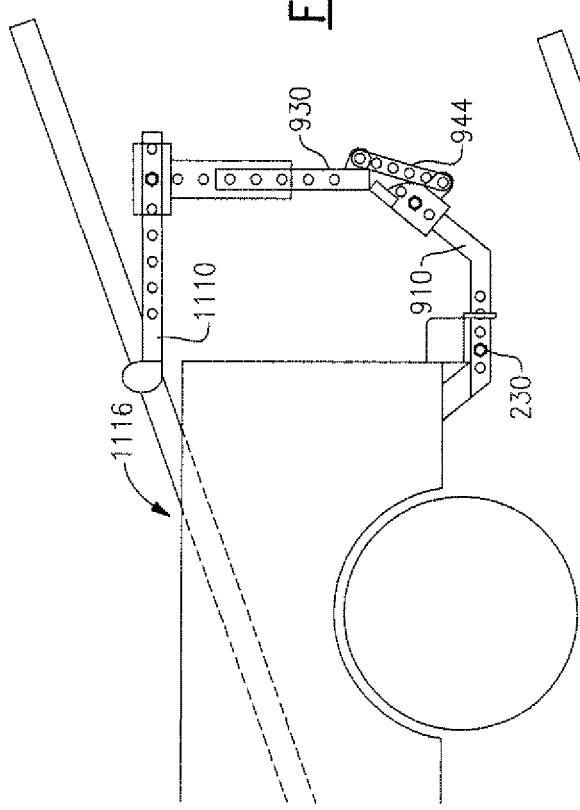
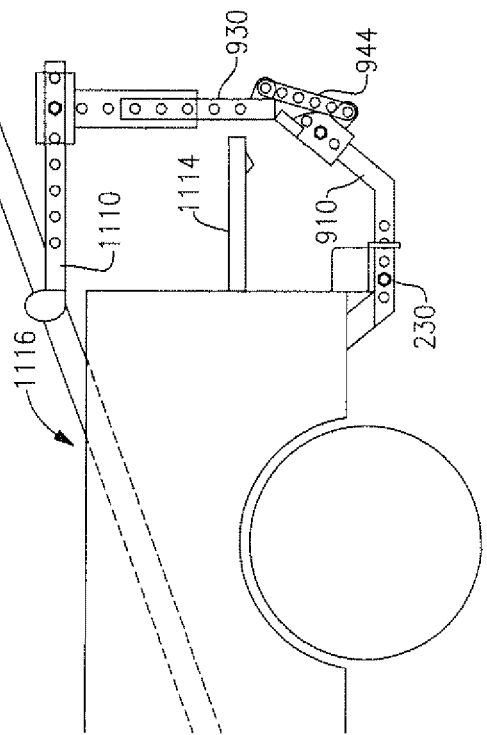

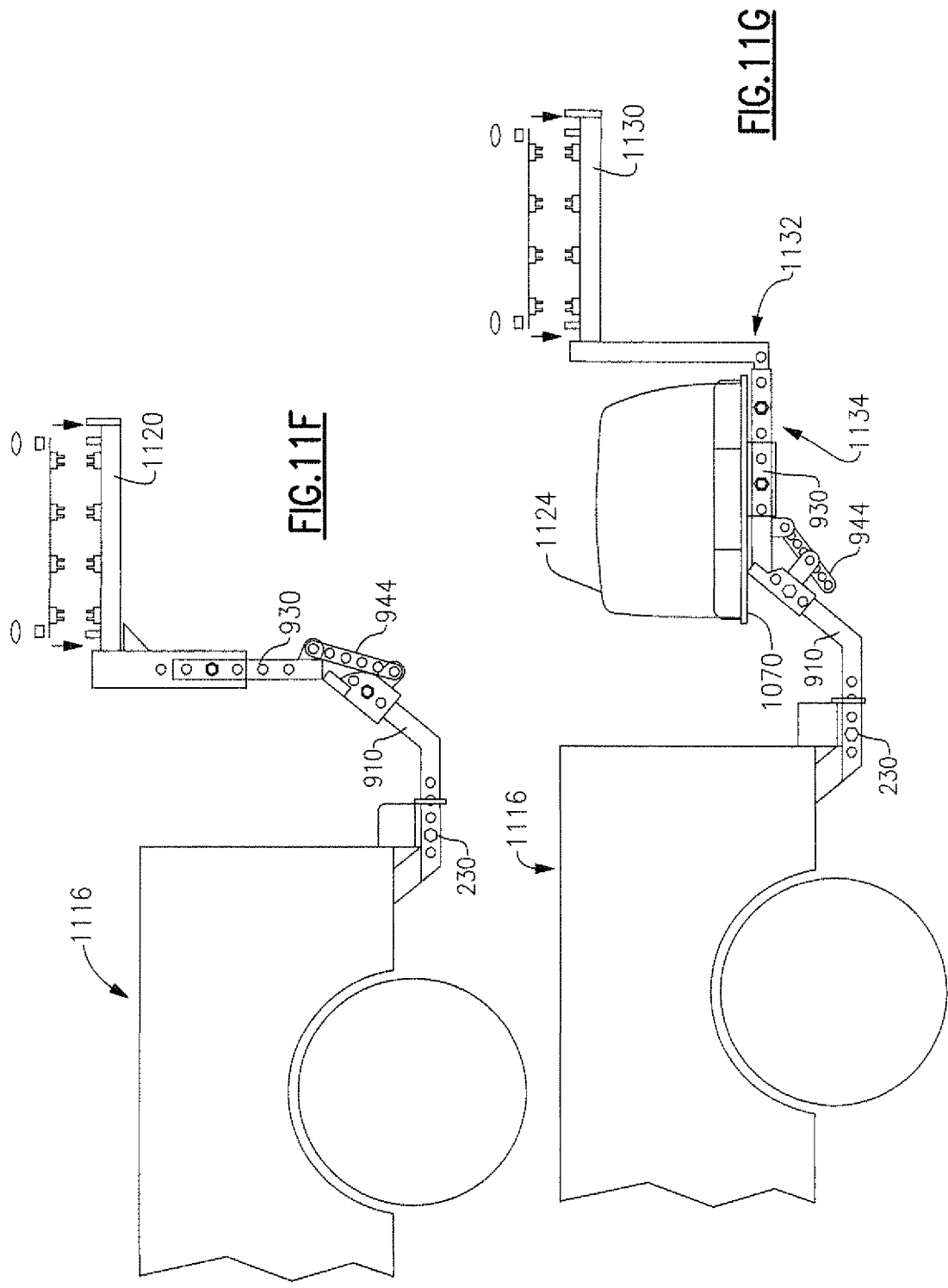

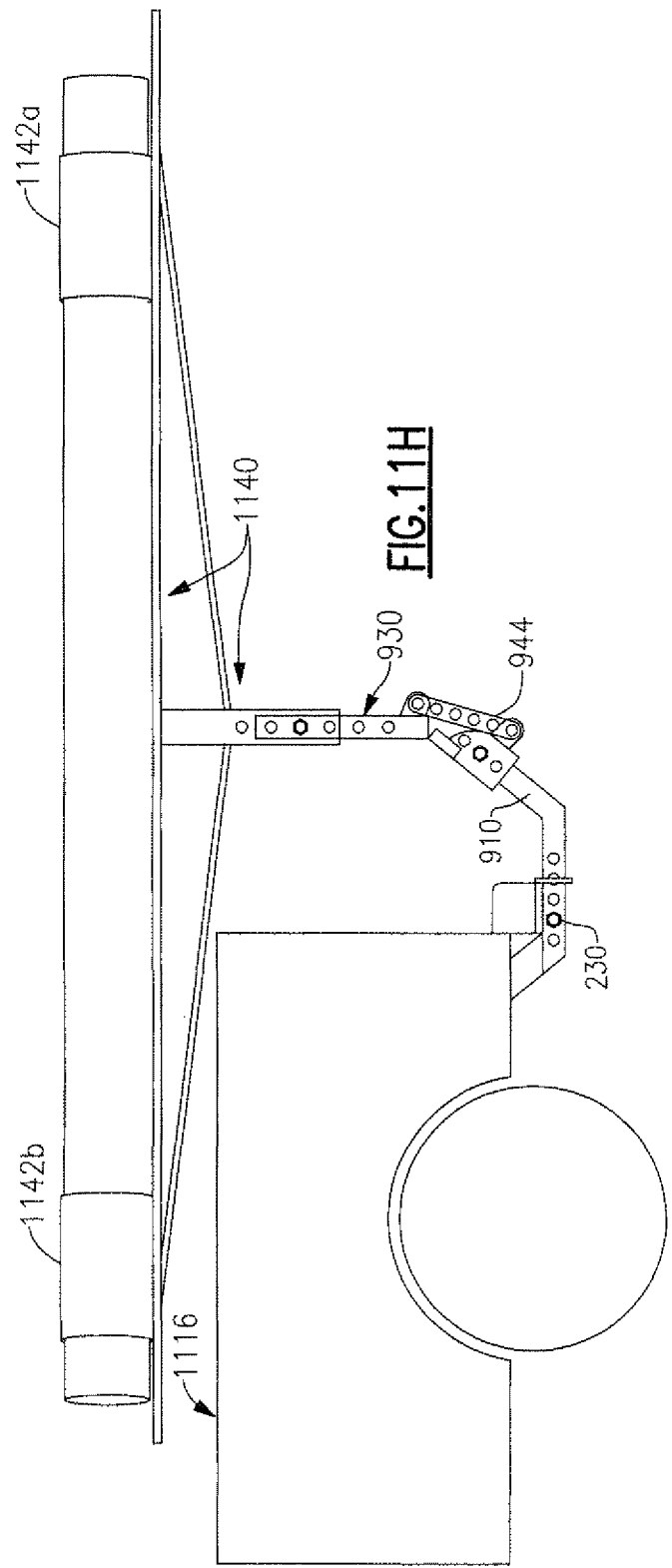

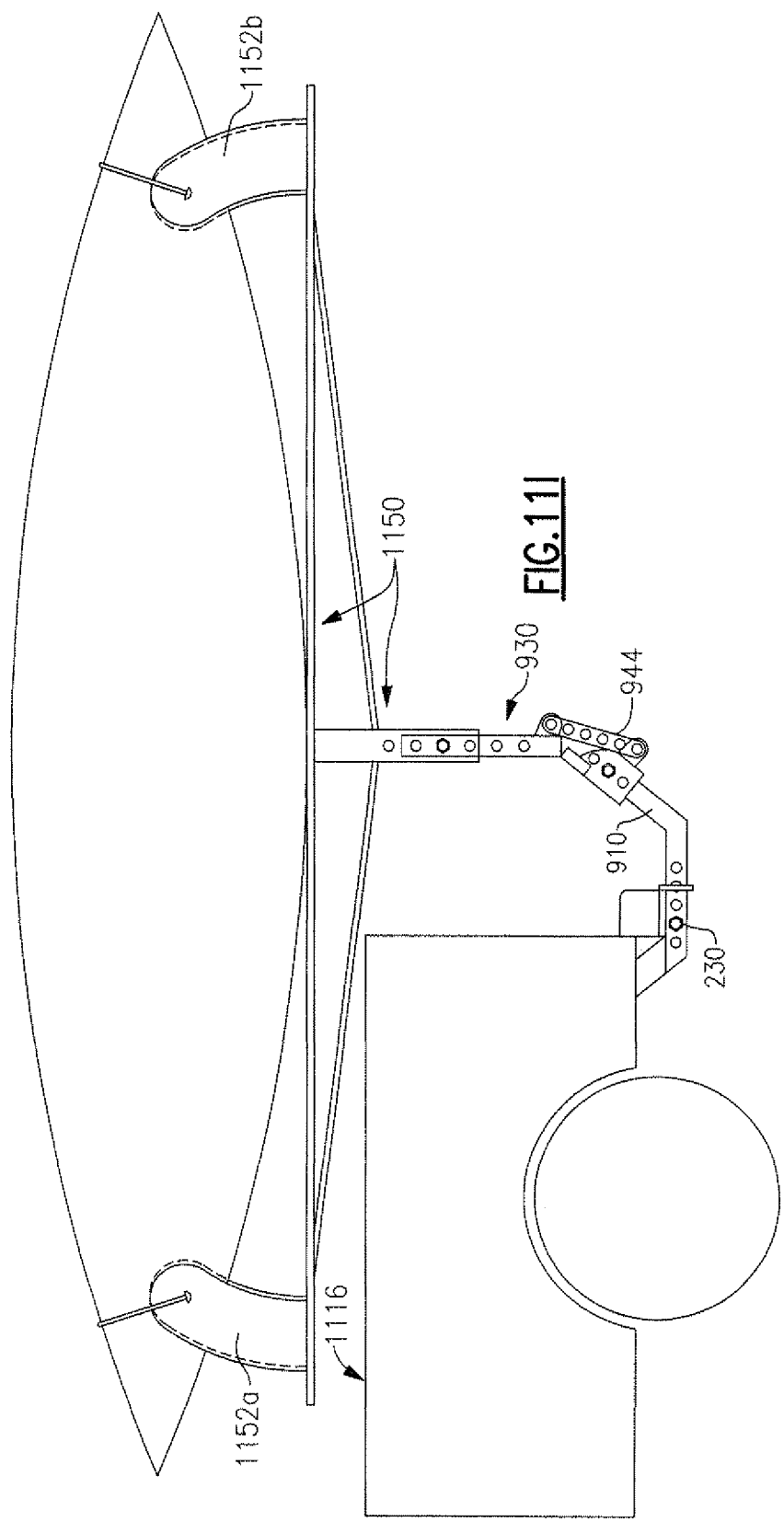

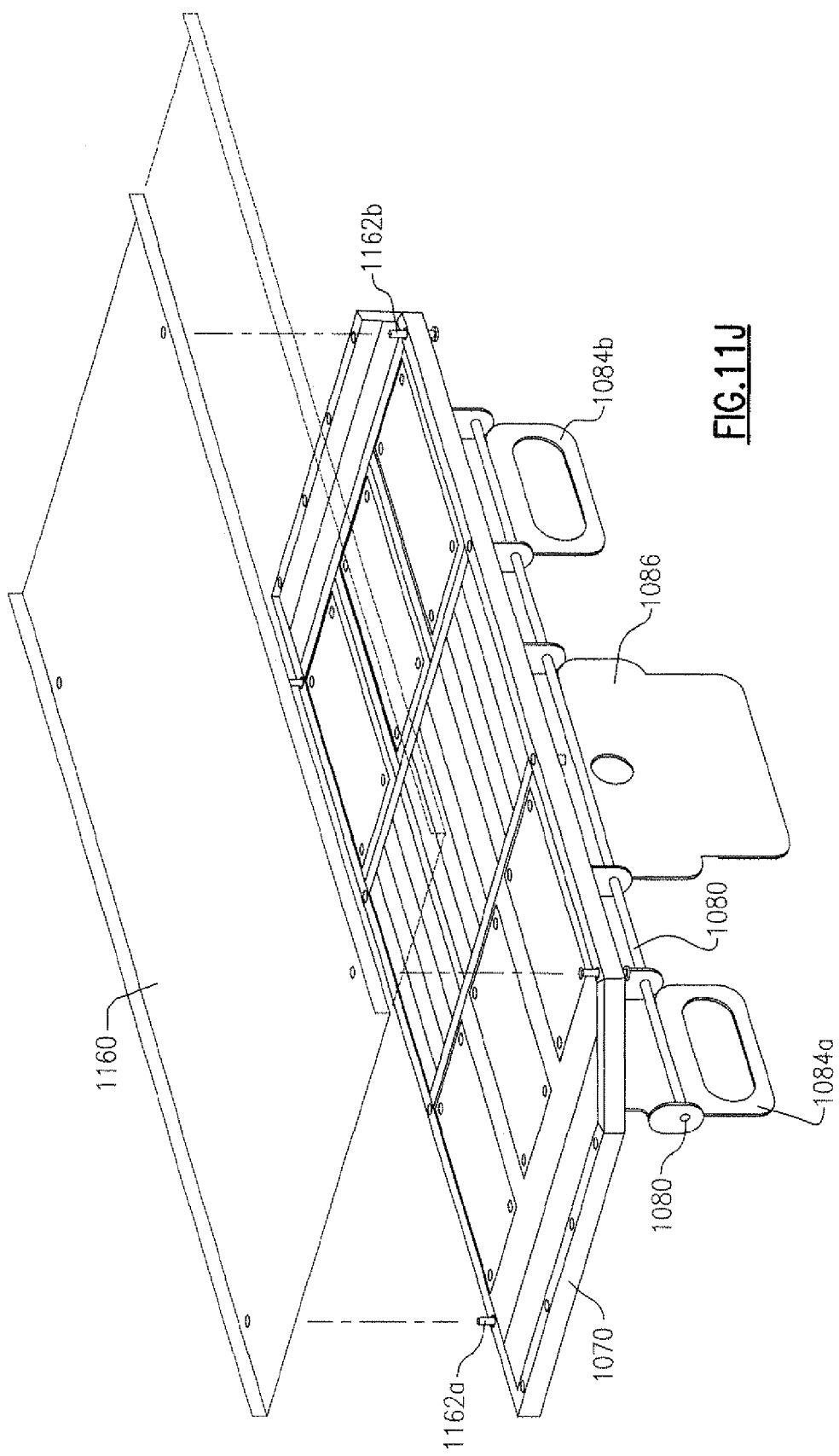

ADJUSTABLE SUPPORT STRUCTURE FOR VEHICLE CARGO BED EXTENSION

CROSS REFERENCE TO RELATED PATENT APPLICATIONS

This is a non-provisional patent application that claims priority and benefit to, co-pending U.S. provisional patent application Ser. No. (61/447,613) that was filed on Feb. 28, 2011 and entitled "Adjustable Support Structure For Extension of a Vehicle Cargo Bed", the aforementioned (61/447,613) patent application is incorporated herein by reference in its entirety.

This non-provisional patent application further claims priority and benefit to, pending U.S. provisional patent application Ser. No. 61/553,624 that was filed on Oct. 31, 2011 and entitled "Adjustable Support Structure for Vehicle Cargo Bed Extension", the aforementioned (61/553,624) patent application is also incorporated herein by reference in its entirety.

CROSS REFERENCE TO PATENT APPLICATIONS INCLUDING RELATED SUBJECT MATTER

This patent application includes subject matter that is similar to the subject matter that is included within U.S. Pat. No. 6,648,391, that is titled "Truck Bed Extension Device" to Whiteford et al. and that was issued Nov. 18, 2003. The aforementioned patent is herein incorporated by reference in its entirety.

This patent application includes subject matter that is similar to the subject matter that is included within U.S. Design Pat. No. D441,340, that is titled "Truck Bed Extension" to Whiteford et al. and that was issued May 1, 2001. The aforementioned patent is herein incorporated by reference in its entirety.

FIELD OF THE INVENTION

This invention relates to an apparatus, system and method for adjustable support of an extension of a vehicle cargo bed. The apparatus provides a range of horizontal, vertical, diagonal and angular adjustment of a vehicle cargo bed extension deck so as to accommodate a wide variety of differently designed and dimensioned vehicles and provides other features promoting reliability and safety while minimizing unwanted vibration during use.

BRIEF DESCRIPTION OF THE DRAWINGS

The objects and features of the invention can be better understood with reference to the claims and drawings described below. The drawings are not necessarily to scale, and the emphasis is instead generally being placed upon illustrating the principles of the invention. Within the drawings, like reference numbers are used to indicate like parts throughout the various views. Differences between like parts may cause those like parts to be each indicated by different reference numbers. Unlike parts are indicated by different reference numbers.

FIGS. 1A-1C illustrate a side view of an embodiment of a lower support apparatus for attachment to a vehicle including a cargo bed structure.

FIGS. 2A-2B illustrates an end view of the embodiment of the first segment of the lower support apparatus of FIG. 1 and an end view of a vehicle hitch.

FIG. 3 illustrates a side view of the embodiment of the apparatus of FIG. 1 being configured with the deck support unit folded upwards.

FIG. 6 illustrates an end view of an embodiment of the hinged second segment of the deck support unit.

FIG. 7 illustrates an end view of an embodiment of the third segment of the deck support unit.

FIGS. 9A-11K illustrate other embodiments of an apparatus for attachment to a vehicle including a cargo bed structure and accessories to attach thereto.

DETAILED DESCRIPTION OF THE INVENTION

Figure 8:
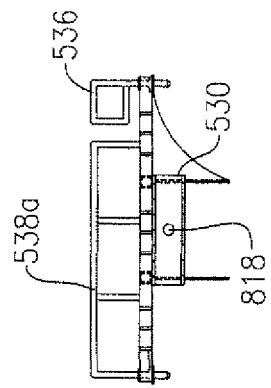
FIG. 8 illustrates a side cross-sectional view of an embodiment of the deck (section A-A)

FIGS. 1A-1C illustrate a side view of an embodiment of a lower support apparatus for attachment to a vehicle including a cargo bed structure. This embodiment includes a first segment 110, a second segment 120 and a third segment 130. The third segment 130 functions as a deck support unit 130 for physically engaging and supporting a deck component 170 (See FIGS. 4-5). The deck 170 is designed for carrying cargo extending beyond a cargo bed area of a vehicle (not shown).

As shown, a first segment 110 includes a horizontal portion 111a and a non-horizontal portion 111b and has a first end 110a and a second end 110b. The horizontal portion 111a including the first end 110a that is designed to be attachable to a hitch (not shown here) that is fixedly attached to a vehicle (not shown). The non-horizontal portion 111b including the second end 110b is designed to attach to the second segment 120 (Also see FIG. 6). The first end 110a is designed to slidably engage the hitch along a first axis 150. The first segment 110 has a long dimension that is parallel to axis 150.

A sliding position of the first segment 110 relative to the hitch is adjustable and lockable in a direction along the first axis 150. Locking holes 112a-112d are manufactured within the first segment 110 to enable the sliding position to be locked via a threaded locking bolt (threaded ⅝ inch bolt) (not shown) that is designed to be inserted through a locking hole in the hitch (not shown) and through one of the locking holes 112a-112d within the first segment 110. Each one of the adjustment holes 112a-112d can be positioned to slide within and align to a adjustment hole of the hitch (See FIG. 2B), as a prerequisite step to inserting the threaded locking bolt through the locking hole of the hitch and through a locking hole 112a-112d of the first segment 110.

As shown, the second segment 120 has a long dimension that is oriented in a diagonal (non-horizontal) direction that is parallel to diagonal axis 152 and has a first end 120a and a second end 120b. The first end 120a of the second segment is designed to slidably engage the second end 110b of the first segment 110. The first end 120a of the second segment includes locking holes 116a-116b which are designed to each slide within and align with one of the adjustment holes 114a-114c of the second end 110b of the first segment 110, as a prerequisite step to inserting the threaded locking bolt through one of the locking holes of the second segment 116a-116b and through a locking hole 114a-114c of the first segment 110.

The second segment 120 and the third segment 130, are connected by a hinge mechanism 140. The hinge mechanism 140 is designed to adjust an orientation of the third segment 130, which functions as and is referred to herein as a deck support unit 130 for extension of a cargo bed (not shown) of the vehicle (not shown). The hinge 140 attaches the second end 120b of the second segment 120 to a first end 130a of the third segment (deck support unit) 130. As properly installed onto a vehicle, the deck support unit 130 of the apparatus 100 and a deck 170 that is attached on top of the deck support unit (See FIGS. 4-5) is substantially parallel to a geometric plane defined by a floor area of the cargo bed. Locking holes 118a-118d are employed to adjust a sliding position of the deck 170 onto the third segment 130. The third segment 130 has a long dimension that is parallel to axis 154.

A position of the hinge mechanism 140 can be defined by an interior angle 142a and/or an exterior angle 142b. As shown, when properly installed, the interior angle 142a is smaller than the exterior angle 142b. When adjusting the hinge 140, as the interior angle 142a becomes larger the exterior angle 142b becomes smaller.

The size of the interior angle 142a is adjustable and lockable via a adjustment link 144. As shown in this embodiment, the adjustment link 144 is manufactured with a ring at each end. Each ring is generally circular in shape and is designed to engage a pin (like a large bolt) that can protrude (not shown here) through each of the hinge angle adjustment holes 146a-146b at locations 146a-146b. A first pin (large bolt) 148a (not shown here) protrudes through hole 146a which is proximate to the second end 120b of the second segment 120. A second pin (large bolt) 148b (not shown) protrudes through hole 146b which is proximate to the first end 130a of the third segment 130. In some embodiments, the first and second pin are clevis type pins.

As also shown in this embodiment, the adjustment link 144 has a long dimension that is adjustable via a threaded connection between (2) separate portions 144a-144b of the adjustment link 144, that slide along a same axis that is parallel to the long dimension of the adjustment link 144. When these (2) portions 144a-144b are screwed in a direction closer to each other, the long dimension of the adjustment link 144 is shortened, and when these (2) portions 144a-144b are screwed in a direction farther apart, the long dimension of the adjustment link 144 is elongated.

The adjusted length of the adjustment link 144 sets the interior angle 142a of the hinge 140. That is, the more elongated the length of the adjustment link 144 the larger the interior angle 142b of the hinge 144 while the shorter the length of the adjustment link 144 smaller the interior angle 142b of the hinge 144.

As properly installed onto a vehicle, the deck support unit 130 of the apparatus 100 is substantially parallel to a plane defined by the floor area of the cargo bed deck. For proper installation upon each separate and different vehicle, the proper sliding engagement position between the first segment 110 and the second segment 120 may vary and the proper angle of the hinge 140 may also vary. Also the proper sliding engagement position between the first segment 110 and the vehicle hitch may also vary.

Hence, the sliding engagement between the first segment 110 and the second segment 120, the sliding engagement between the second segment 120 and the first segment 110 and the angle of orientation between the second segment 120 and the third segment (deck) 130 via the hinge 140, enables the lower support unit apparatus 100 to adjust to a wide variety of vehicles, while supporting a substantial load for each proper and different installation.

FIG. 1C shows a variation of the embodiments of FIGS. 1A-1B wherein the first segment 110 is elongated and further attaches a ball hitch 150 to accommodate towing, of a trailer for example. This embodiment also includes an additional structural member 160 to better support a diagonal portion 111b of the first segment 110.

FIGS. 2A-2B illustrates an end view 110a of the embodiment of the first segment 110 of the lower support apparatus 100 of FIG. 1 and an end view of a vehicle hitch 230. The first segment 110 is designed to be inserted into a cavity of a vehicle hitch 230.

The first segment 110 is constructed from a metal tube 210 having a substantially square cross-section. In this embodiment, the metal is referred to as cold rolled steel. The metal tube 210 has outside dimensions (OD) that measure 2.0 inches vertical (high) and 2.0 inches horizontal (wide), as shown in this view. The thickness of the metal tube 210 is 0.25 inches. Hence, the metal tube 210 has inside dimensions (ID) that measure 1.5 inches vertical (high) and 1.5 inches horizontal (wide), as shown in this view.

There are (4) threaded adjustment holes 112a-112d that are located on the right side of the first segment 110, as shown in this view and that are shown in FIG. 1A. There are (4) unthreaded adjustment holes 162a-162d that each align with adjustment holes 112a-112d respectively, and that are located on the left side of the first segment 110 as shown in this view and that are not shown in FIG. 1A. These adjustment holes 112a-112d and 162a-162d are sized to accommodate a ⅝ inch diameter threaded bolt of 3 or more inches in length.

The vehicle hitch 230 for which it is inserted has a rectangular inside cross-section of slightly more than 2 inches vertical (high) and 2.0 inches horizontal (wide). In one embodiment, the vehicle hitch inside cross-section is 2 plus $^{85}/_{1000}$ inches vertical (high) and 2 plus $^{85}/_{1000}$ of an inch horizontal (wide).

Notice that the right side of an inside portion 208 of this first segment 110 has a metal bar 212 that is spot welded onto a inner right side of the outer metal tubing 210. Absent the metal bar 212, the cross-section of the inside portion 208 of this metal tube 210 measures 1.5 inches vertical and 1.5 inches horizontal. The metal bar 212 has a horizontal width dimension equal to $^{3}/_{16}$ inches. Hence, with the metal bar 212 installed, the cavity cross-section 218 of this metal tube 210 measures 1.5 inches vertical and 1$^{5}/_{16}$ inches horizontal.

The metal bar adds $^{3}/_{16}$ inches of thickness, (also referred to herein as additional material to provide for a depth extended threaded hole) of the right side wall to provide more structural material (metal) through which to bore threads for engaging a threaded bolt and for attaching the first segment 110 to the vehicle hitch 230. To attach to the vehicle hitch 230, a threaded bolt is inserted through an unthreaded hole 232a-232d of the hitch 230, and passed through an unthreaded hole 162a-162d of the first segment 110 and is threaded through a corresponding threaded hole 112a-112d of the first segment 110 and passed through an unthreaded hole 262a-262b of the vehicle hitch 230. This technique incorporated throughout the apparatus 100, 900 provides much added strength without much added weight.

Turning the bolt in the above described manner through the threaded holes 112a-112d moves and presses the first segment 110 towards and against the left inner side wall of the hitch 230. Tightening the bolt presses the first segment 110 tightly against left inner side wall of the hitch 230, in order to minimize vibration and wobble between the hitch 230 and the first segment 110, when the hitch 230 and lower support unit 100 are in use.

In this embodiment, note that the adjustment holes 112a-112d are threaded and the adjustment holes 162a-162d are not threaded. In other embodiments, at least some of the adjustment holes 112a-112b are not threaded and some corresponding adjustment holes 162a-162d are threaded. Likewise adjustment holes 114a-114c, which are proximate to the second end of the first segment 110b, are also threaded in the same manner as shown here and correspond to non-threaded adjustment holes that are located on an opposite side of the first segment 110, like shown herein FIG. 2A.

FIG. 3 illustrates an embodiment of the apparatus 100 being configured with the third segment (deck support segment) 130 folded upwards when not in use. When attached to the deck 170 (See FIG. 4), the deck itself 170 would also be oriented upwards while attached to the third segment 130. The embodiment shown here includes a different type of adjustment link 144x than shown in FIG. 1. The adjustment link 144x shown here is designed to have a fixed length as opposed to the adjustable length of the adjustment link 144 of FIG. 1.

As shown, the adjustment link 144x, is a one piece rigid component made of metal and having an angled shape like that of a boomerang. In this embodiment, this component includes (2) substantially straight portions that join at an angle to form its 144x angled shape. The angled adjustment link 144x shown here is designed to separate the hinge adjustment holes 146a-146b at a fixed distance so that a long dimension of the third segment 130 is oriented in a substantially vertical direction, which is a direction that is substantially parallel to the direction of gravity, while the first, second and third segments are attached to each other and installed onto a vehicle.

Other embodiments of the adjustment pin are each manufactured as (1) straight segment having a length that is likewise, designed to separate the hinge adjustment holes 146a-146b at a fixed distance in order to perform a fine adjustment to a substantially horizontal position of the long dimension of the third segment 130, while it 130 is attached to the second segment 120 via the hinge mechanism 140, and while the first, second and third segments are attached to each other and installed onto a vehicle. The horizontal position is perpendicular to the direction of gravity. For example, the length of each of these different straight adjustment link 144x embodiments is designed to position the third segment 130 to be tilted at an angle between 0, 2, 4 and 6 degrees relative to a horizontal orientation.

For example, when the third segment 130 is at a −2 degree angle, a distal end 130b would be lower than at a 0 degree angle relative to a horizontal orientation. Likewise, when the third segment 130 is at a 2 degree angle, a distal end 130b would be higher than a 0 degree angle relative to a horizontal orientation.

The orientation of a deck 170 will change in response to carrying a substantial load, such as for example 500 pounds. Setting a 2, 4 or 6 degree angular orientation of the deck 170 before it is carrying a load, may enable the deck 170 to arrive at a horizontal angular orientation when carrying a substantial load. This change in angular orientation is dependent upon the design of the vehicle and its associated vehicle hitch 230. Hence, the angular orientation of the deck in response to carrying a substantial load can be anticipated and such an angular adjustment prior to carrying the load can provide an improved deck angular orientation when later carrying a substantial load.

The length of each of these straight segments is designed to adjust an angle of the third (deck support) segment relative to the direction of gravity. The length of this segment separates the hinge adjustment holes 146a-146b at a fixed distance to adjust an angle of the third (deck support) segment relative to the direction of gravity.

In some embodiments, the length of this segment is designed to fixedly separate the position the adjustment holes 146a-146b in order to adjust a position of a long dimension of the third segment 130 to be at a horizontal angle, which is perpendicular to the direction of gravity, when the first, second and third segments are attached to each other and installed onto a vehicle.

For the embodiment shown, the length 311a of the horizontal portion 111a of the first segment 110 is 15 inches, the length of 311b of the non-horizontal (diagonal) portion is 19.25 inches, the length 320 of the second segment 120 is 9 plus 1/16 inches, and the length 330 of the third segment is 21 inches.

For this embodiment, there is a minimum overlap between the first segment 110 and the second segment 120 equal to 3 inches and a minimum non-overlap equal to 1 inch. As a result, for this embodiment a minimum diagonal extension is approximately 20.25 (19.25+1 inches) inches when the second segment 120 is slid over the first segment 110 to the maximum extent. And for this embodiment, the maximum diagonal extension is approximately 25.3125 (19.25+9.0625−3) inches when the second segment 120 is slid over the first segment 110 to the minimum extent Hence, the diagonal extension range is approximately 5 inches. Given that the diagonal extension shown here is at a 45 degree angle above horizontal, the vertical range component of the diagonal extension range is approximately 3.5 inches. Likewise, given that the diagonal extension shown here is at a 45 degree angle above horizontal, the horizontal range component of the diagonal extension range is approximately 3.5 inches.

In other embodiments, the first segment 110 and/or the second segment 120 are elongated beyond the embodiment shown here to realize a larger range of diagonal, vertical and horizontal extension to further accommodate various vehicle and truck designs. Or alternatively, the first segment 110 is shortened while the second segment is elongated.

In another embodiment, the length of the second segment is extended to 15.125 inches from 9.125 inches, and the minimum overlap is equal to 4 inches and the minimum non-overlap remains equal to 1 inch. For this embodiment a minimum diagonal extension remains equal to 20.25 inches when the second segment 120 is slid over the first segment 110 to the maximum extent. In this embodiment, the maximum diagonal extension is approximately 30.3125 inches when the second segment 120 is slid over the first segment 110 to the minimum extent.

Hence, the diagonal extension range is approximately 10 inches. Given that the diagonal extension remains equal to a 45 degree angle above horizontal, the vertical range component of the diagonal extension range is approximately 7 inches. Likewise, given that the diagonal extension shown here is at a 45 degree angle above horizontal, the horizontal range component of the diagonal extension range is approximately 7 inches.

Figure 4:
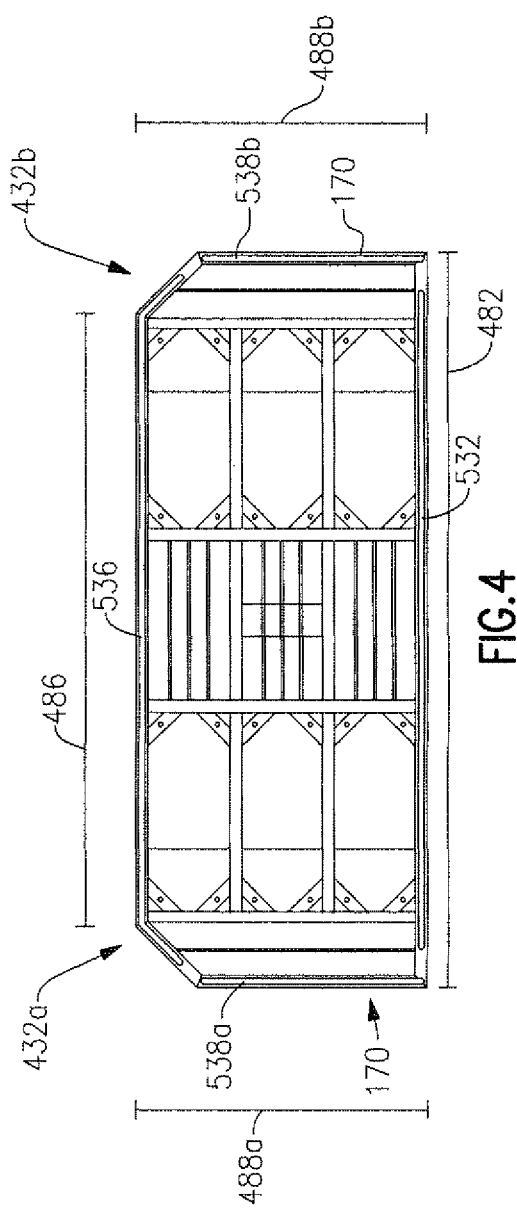
FIG. 4 illustrates a top view of an embodiment of a deck that is attachable to the lower support apparatus.

In the embodiment shown, a range of adjustment between adjustment holes 112a-112d is at least 5 inches and a range of adjustment of between adjustment holes 118a-118d is at least 8 inches. Other embodiments can expand these adjustment ranges. FIG. 4 illustrates the dimensions of an embodiment of a deck 170 attached to the lower support apparatus 110 from a top-down viewing perspective. As shown from this viewing perspective, this embodiment has beveled corners 432a-432b along its rear side that is located farthest from the hitch 230 (not shown here). The deck 170 has an upper surface (shown from this perspective) and a lower surface (not shown from this perspective). The deck 170 is supported via engagement with the third segment 130 (See FIGS. 1A-1C) along its lower surface (See FIG. 5). A top view of a front safety rail 532, a top view of a rear safety rail 536, a top view of a right side safety rail 538a and a top view of a left side safety rail 538b, are also shown.

For the embodiment shown, a length 486 of a rear edge of the deck 170 is 51 inches, a length 482 of a front edge of the deck 170 is 61 inches, a length 488b of a left side edge of the deck 170 is 19 plus 1/16 inches and a length 488a of distance from the rear edge to the font edge of deck 170 is 19 plus 1/16 inches.

Figure 5:
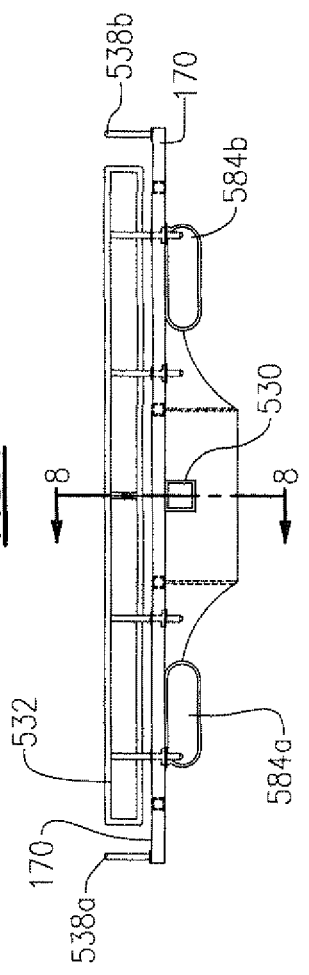
FIG. 5 illustrates the dimensions of a rear view perspective of an embodiment of the deck.

FIG. 5 illustrates the dimensions of a rear view perspective of an embodiment of the deck 170. As shown from this perspective, this embodiment includes removable safety rail 532 and traffic signaling lights 584a-584b and a lower support unit engagement member 530. As shown, a lower support unit engagement member 530, is a rectangular tube like structure that is dimensioned so that the third segment 130 of the lower support unit 100 can slide into it 530 and be locked at a sliding position via locking adjustment holes and bolts 118a-118d located within the third segment 130 and locking adjustment holes located within the lower support unit engagement member 530 (not shown here), to provide support to the deck 170. The engagement member 530 is sized and shaped like the vehicle hitch 230 (See FIG. 2B) and the sliding position is adjusted and locked as described between the vehicle hitch 230 and the first segment 110, as described in association with FIG. 2A.

FIG. 6. illustrates a view of an end 120b of an embodiment of the second segment 120 of the deck support unit. This end 120b constitutes one side of a hinge mechanism 140. As shown in FIGS. 1A-1B, the second segment 120 is designed to slide over and fixedly attach to a distal end 110b of the non-horizontal portion 111b of the first segment 110 of the deck support unit 100. As shown, the second segment 120 includes (4) adjustment holes 116a-116b. that can be aligned with the adjustment holes 114a-114c of the non-horizontal portion 111b of the first segment to adjust a sliding position. The sliding position is adjusted and locked in the same manner as described for the sliding position between the vehicle hitch 230 and the first segment 110, as described in association with FIG. 2A.

FIG. 7. illustrates a view of an end 130a of an embodiment of the segment 130 of the deck support unit 100. This end 130a constitutes one side of a hinge mechanism 140 that is opposite end 120b of the second segment 120. Adjustment holes 118a-118d of the third segment 130 are employed while sliding the lower support unit engagement member 530 of the deck 170 (FIGS. 4-5) over end 130b and along the outside surface of the third segment 130. The sliding action starts by inserting end 130b of the third segment 130 into the lower support unit engagement member 530 of the deck 170, like the first segment 110 is slide into the vehicle hitch 230. At least one adjustment hole 818 (See FIG. 8) of the lower support unit engagement member 530 is aligned with one of the adjustment holes 118a-118d of the third segment 130. The sliding position is adjusted and locked in the same manner as described for the sliding position between the vehicle hitch 230 and the first segment 110, as described in association with FIG. 2A.

FIG. 8 illustrates a cross-sectional view of an embodiment of the deck 170. From this view, a cross-section of the lower support unit engagement member 530 and right side safety rail 538a are visible. An adjustment hole 818 that is located within the lower support unit engagement member 530, is also visible. The adjustment hole 818 is configured to be aligned with one of the adjustment holes 118a-118d of the third segment 130 of the lower support unit 100 (See FIGS. 1A-1B and 7) or of the third segment 930 of the lower support unit 900 (See FIG. 9A), as described above in association with FIG. 7.

FIG. 9A illustrates another second embodiment of a lower support unit apparatus 900 for attachment to a vehicle including a cargo bed. The apparatus 900 shown here is designed to function like the first embodiment of the lower support unit apparatus 100 of FIG. 1. However, the design of this second embodiment of the lower support unit differs in some respects as compared to the design of the first embodiment of the lower support FIG. 1.

Notice that this second embodiment 900 is shown from a different perspective view than the first embodiment 100 of FIG. 1 and instead, its first segment 910 is shown as being located on a lower right hand side and its third segment 930 is shown as being located on a left hand side with respect to the viewing perspective of FIG. 9A. Conversely, the first embodiment 100 of FIG. 1 is shown where the first segment 110 is shown as being located on a lower left hand side and its third segment 930 is shown as being located on a right hand side with respect to the viewing perspective of FIG. 1. Like the first embodiment 100 of FIG. 1A-1B, the second embodiment of FIG. 9 is shown with its second segment 920 sliding over and physically engaging its first segment 910.

Also shown, this second embodiment includes an embodiment of a sliding adjustment plate 944 that is substituted for the adjustment link 144 of the first embodiment of FIG. 1. The sliding adjustment plate 944, also referred to herein as the adjustment plate 944 or adjustment link 944, includes (6) adjustment holes 940a-940f. The hole 940a is shown as being currently employed for attachment between the adjustment plate 944 and the third segment 930. Another hole 940b-940e can alternatively be selected and employed for attachment between the adjustment plate 944 and the third segment 930. The hole 940c is shown as being currently employed for attachment between the adjustment plate 944 and the second segment 920. Another hole 940b-940f can alternatively be selected and employed for attachment between the adjustment plate 944 and the second segment 920.

Note that although adjacent holes 940a-940f appear to be equidistant, the distance between these pairs of holes 940a-940f are not required to be equidistant so to provide fine adjustment to and angle of orientation of the third segment 930. For example, setting an angle of orientation of the third segment 130 to be 2 degrees above horizontal, then a first pair of adjustment holes can be selected. To set an angle of orientation of the third segment 130 to be 6 degrees above horizontal, then a second pair of adjustment holes are selected. As a result, other pairs of holes are assigned for linking between the third segment 930 and the second segment 920 to effect different angles of orientation of the third segment 130 and an attached deck 170.

As described above, the attachment plate 944 is designed to permit adjustment of an angled pitch of the third segment 930 relative to the first 910 and second 920 segments. For example, in some embodiments, the outside end 932 of the third segment 930 can be lifted or lowered to add or subtract pre-determined increments of an angle of pitch for the third segment 930 relative to a substantially horizontal pitch, as shown in FIG. 9A.

For example and as shown, the attachment plate 944 enables the third segment 930 to be oriented substantially horizontal and parallel relative to the surface of the earth (substantially level) and parallel relative to an angle of orientation of the lower most portion of the first segment 910 that is designed to be fixedly attached to a vehicle hitch. As shown, the pitch of the third segment 930 is also referred to herein as being a substantially level pitch.

Alternatively, the second segment 920 can be adjusted to attach to another hole within the attachment plate 944. For example, in some embodiments, attaching the second segment 920 to the attachment plate 944 via the hole 940d instead of via the hole 940c (as shown) increases the angle pitch of the third segment 930 by for example in some embodiments by (2) degrees, and thereby causing the outside end 932 of the third segment 930 to raise slightly higher than as shown. Or for example, in some embodiments, attaching the second segment 920 via the hole 940b instead of via the hole 940c (as shown) lowers the angle pitch of the third segment 930 by for example in some embodiments, (2) degrees, and thereby causing the outside end 932 of the third segment 930 to drop slightly lower. Hence, the attachment plate 944 can be designed to adapt to a variety of vehicle designs to maximize precise positioning of the vehicle bed extension.

In some embodiments, attaching the second segment 920 to the hole 940f increases the angle pitch of the third segment 930 by (90) degrees relative to a horizontal pitch and thereby causing the outside end 932 of the third segment 930 to sufficiently raise to cause the pitch of the third segment 930 to be oriented substantially vertical and perpendicular relative to a the lower most portion of the first segment 910 (Also See FIG. 3). When oriented in a substantially vertical position, the third segment 930 can function to interface with one or more accessories in order to carry different types of items in different ways as compared to when it 930 is oriented in a substantially horizontal position.

Also notice that in this embodiment, the quantity of and/or location of the adjustment holes 912a-912e of the first segment, 914a-914c (See FIG. 9B) and of the adjustment holes 916a-916c of the second segment and of the adjustment holes 918a-918f of the third segment of this second embodiment of FIG. 9, may differ in some respects with the quantity and/or location of the adjustment holes 112a-112d, 114a-114c, 116a-116b and 118a-118d of the first embodiment of the lower support of FIG. 1.

Note that within this second embodiment of FIG. 9A, the adjustment holes 914a-914c (Best seen in FIG. 9B) of the upper portion of the first segment 910 are obstructed from view by the second segment 920 which is shown as having been slid over the upper portion of the first segment 910.

FIG. 9B illustrates a close-up perspective view of the entire first segment 910 of the second embodiment of the lower support unit. The adjustment holes 914a-914c of the upper portion of the first segment 910 of the lower support unit 900 are visible and not obstructed from view by the second segment 920, as shown in FIG. 9A. Notice that the adjustment holes 912a-912e of the lower portion of the first segment 910 and that the adjustment holes 914a-914c of the upper portion of the first segment 910 are threaded and are designed to receive a threaded locking bolt as described with respect to the first embodiment of the lower support unit and in association with FIG. 2A.

FIG. 10A illustrates a perspective view of a second embodiment of a deck 1070 that includes a removable side rails 1032, 1036, 1038a-1038b, repositionable tail light fixtures 1084a-1084b and a repositionable license plate fixture 1086. As shown, along a rear side of the deck 1070 is attached a rotatable shaft 1080 which is attached to a left tail light support fixture 1084a, and attached to a right tail light support fixture 1084b and attached to a license plate support fixture 1086. The rotatable shaft 1080 is designed to rotate and to alter a direction in which the tail light support fixtures 1084a-1084b and license plate fixture 1086 face.

As shown, the deck 1070 is oriented horizontally for the purpose of extending a cargo bed while carrying items. Also shown, the tail light support fixtures 1084a-1084b and the license plate support fixture 1086 are planar in shape and each oriented vertically and perpendicular to the orientation of the deck 1070, and facing towards traffic located towards the rear side of the deck.

Figure 11B:
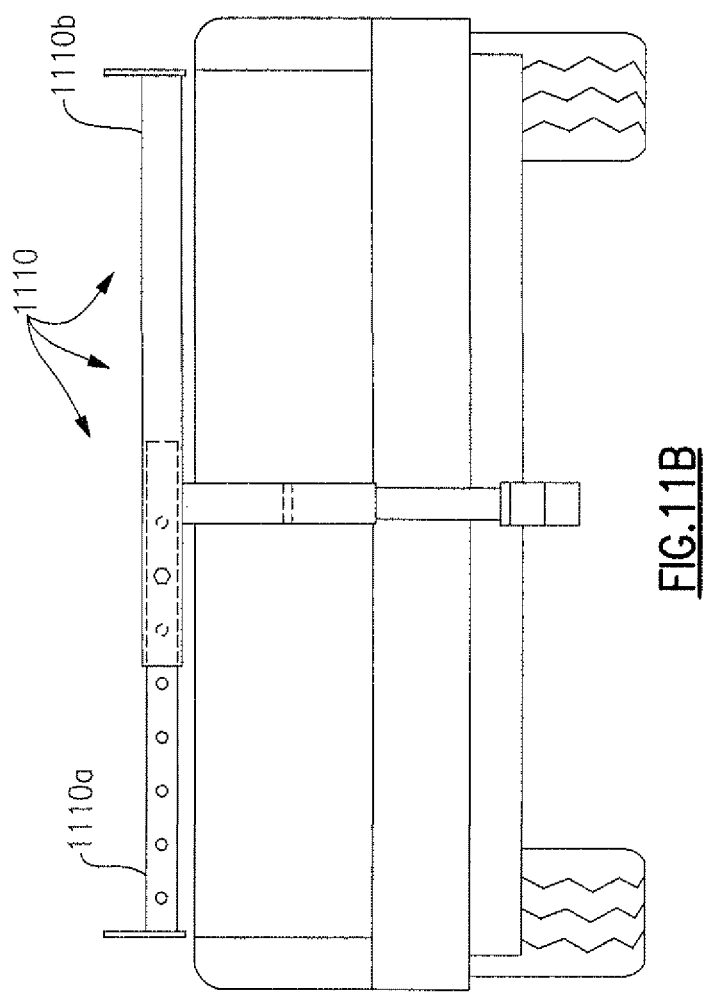
Figure 11C:
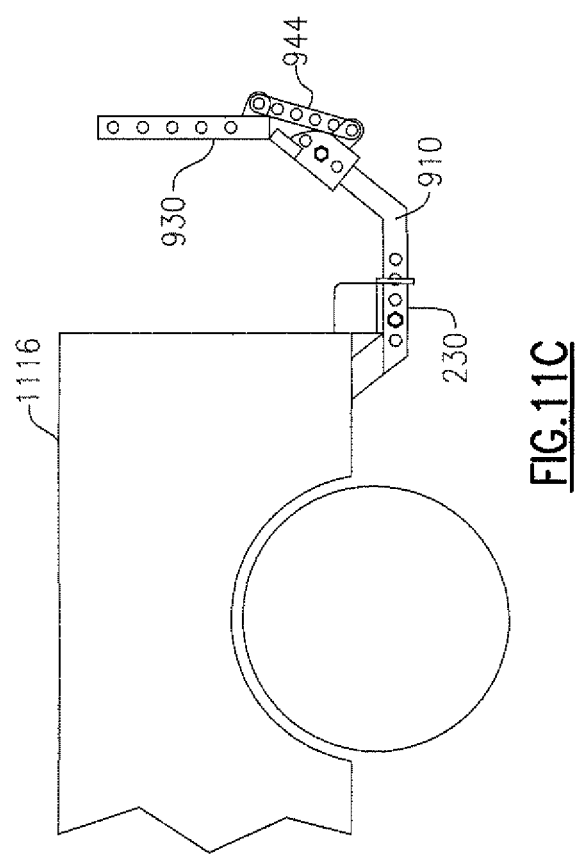

When not being employed for extending a floor of the cargo bed, the third segment 130, 930 of the lower support apparatus 100, 900 can be oriented into a vertical position with or without an attached deck 170, 1070 (See FIGS. 3 and 11C). When the deck 1070 is oriented in this vertical position, the rear edge of the deck 1070 and the tail light support fixtures 1084a-1084b and the license plate support fixture 1086 located along the rear edge of the deck 1070 are lifted higher in elevation and are redirected to face upward. In this position, the orientation of tail light support fixtures 1084a-1084b and of the license plate fixture 1086 can create a risk of being not visible to traffic and creating an increased a risk of collision.

To address this problem, the rotatable shaft 1080 is rotatable so that the tail light support fixtures 1084a-1084b and the license plate support fixture 1086 can continue to face traffic while the deck 1070 is oriented into vertical position.

Figure 10B:
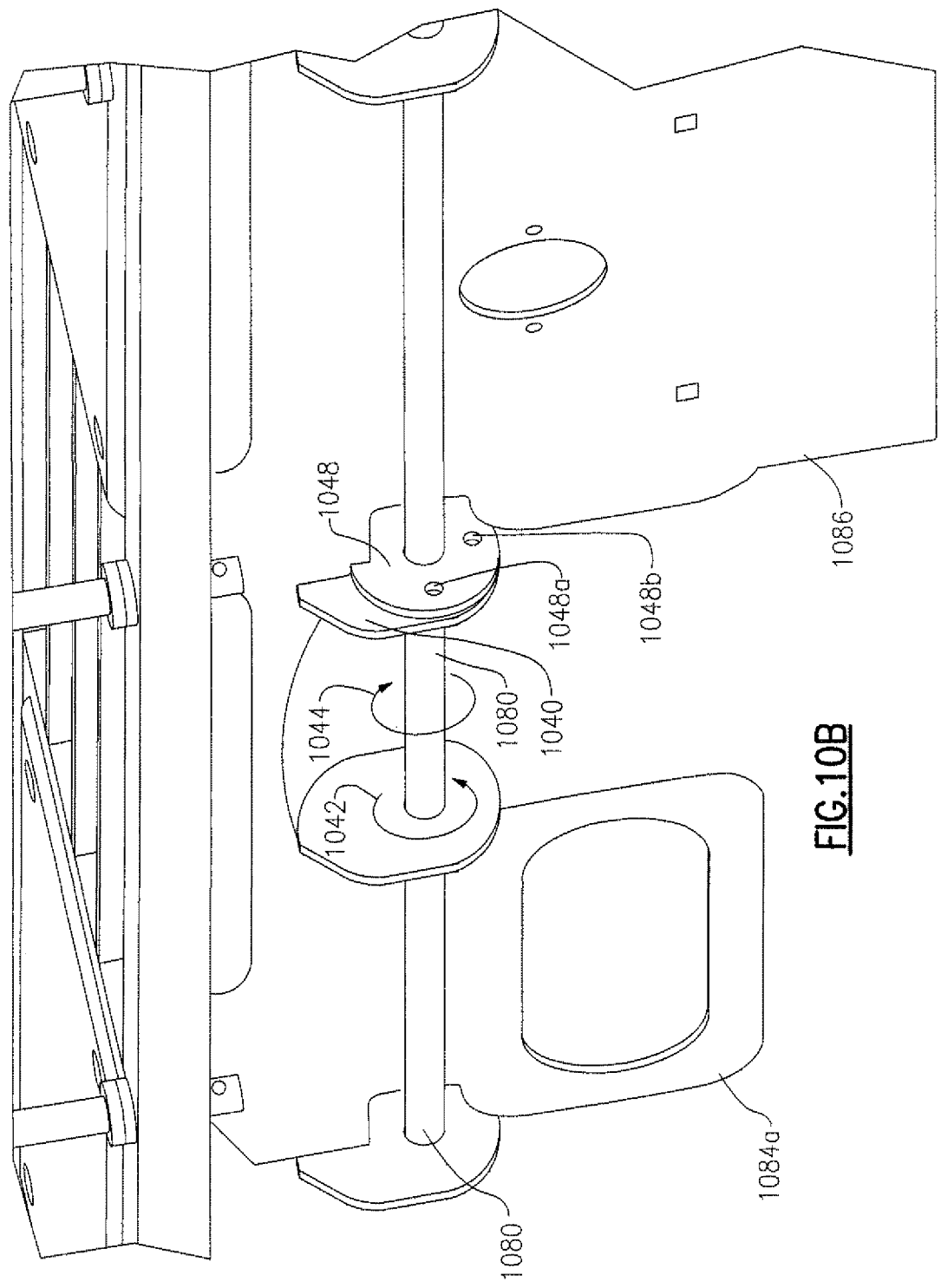

FIG. 10B illustrates a close-up of the repositionable tail light fixture 1084a and the repositionable license plate fixture 1086. As shown, a circular shaped plate 1048 including a plurality of holes 1048a-1048b is fixedly attached to the rotatable shaft 1080 and rotates with the rotatable shaft 1080. A stationary plate 1040 that is not fixedly attached to the rotatable shaft and that does not rotate with the rotatable shaft 1080 includes at least one spring loaded pin (not shown) that is designed to protrude through hole 1048b while in the position shown.

In preparation for orienting the deck 1070 into a vertical position, the rotatable shaft 1080 can be rotated in a direction 1042 so that the spring loaded pin (not shown) protruding through hole 1048b instead protrudes through hole 1048a to enable the tail light fixtures 1084a-1084b and the license plate fixture 1036 to be seen by traffic while the deck 1070 is oriented in a vertical position while attached to the vertically configured lower support unit 100, 900 (See FIGS. 3 and 11C).

In preparation for orienting the deck 1070 back into a horizontal position, the rotatable shaft 1080 can be rotated in a direction 1044 so that the spring loaded pin (not shown) protruding through hole 1048a instead protrudes again through hole 1048b to enable the tail light fixtures 1084a-1084b and the license plate fixture 1086 to be seen by traffic while the deck 1070 is oriented in a horizontal position.

Figure 10C:
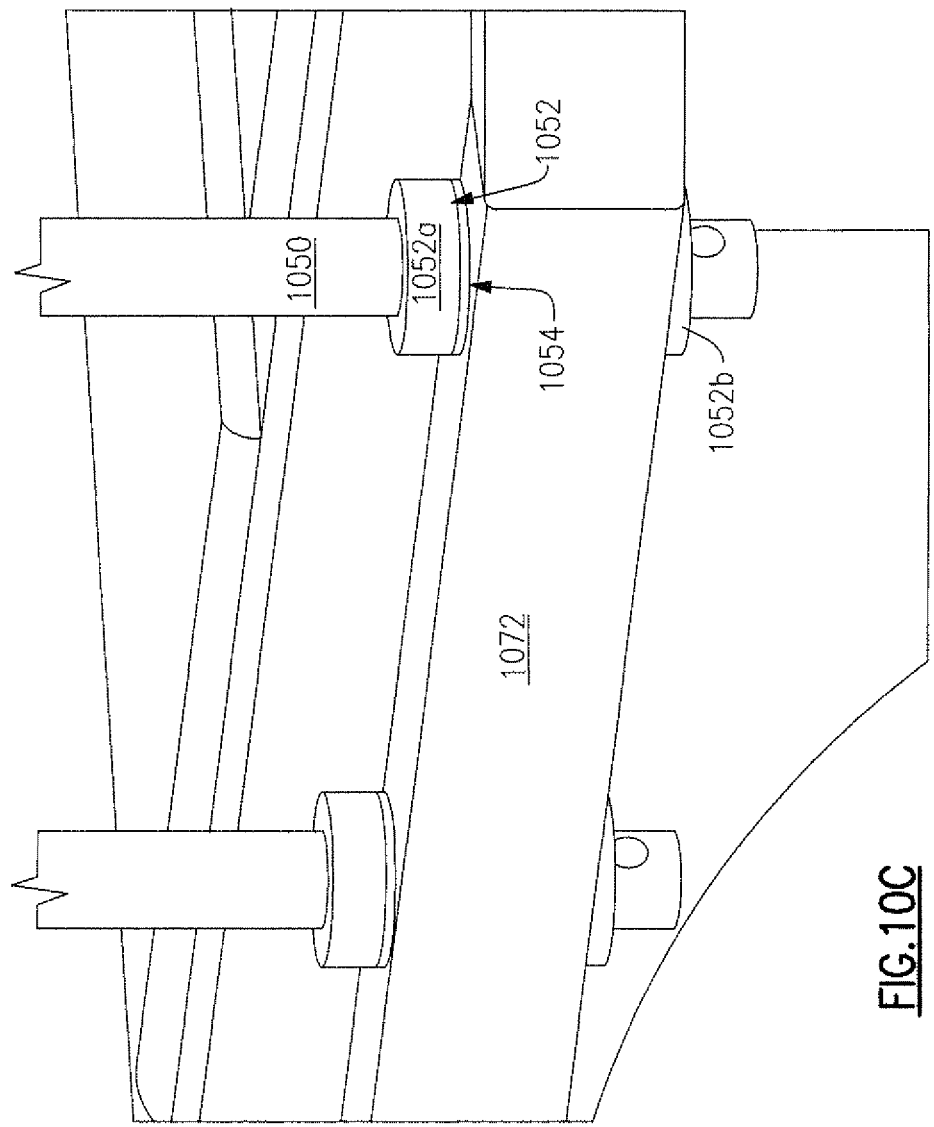

FIG. 10C illustrates a close-up of an attachment of a perimeter fence 1032, 1036, 1038a-1038b to the deck 1070. As shown, a portion 1050 of the fence, also referred to herein as a fence post 1050, passes through and attaches to a structural member 1072 of the deck 1070. The structural member 1072 is a rectangular tube having rectangular cross-section (not shown) through which a metal sleeve 1052 passes through a top surface and through a bottom surface (as shown here) of the structural member 1072. The metal sleeve 1052, also referred to herein as a bushing 1052, receives and enables the fence post 1050 to pass through it 1052 and the structural member 1072 through which it also passes through.

A rubber o-ring 1054 is disposed between an upper portion of the bushing 1052a and the perimeter segment 1072 and is designed to dampen transmission of vibration between the deck 1070 and the fence 1050. A lynch pin (not shown) that is located near the bottom portion 1052b of the bushing is employed to securely attach the fence post 1050 to the structural member 1072 of the deck 1070.

FIG. 11A illustrates a side view of a t-bar accessory 1110 that is attachable to the lower support structure 900. As shown, a t-bar structure 1110, instead of the deck 1070, is attached to the third segment 930 of the lower support structure 900. A first portion of the t-bar structure 1110, slides over and attaches to the third segment 930. The sliding position between the first portion of the t-bar 1110 and the third segment 930 of the lower support unit is adjustable via adjustment (locking) holes 1112 of the first portion of the t-bar 1110 and adjustment (locking) holes of the third segment 918a-918f of the lower support unit. Adjustment locking bolts are employed for insertion into a locking hole 1112 of the t-bar 1110 and adjustment holes 918a-918f of the third segment 930 in order to lock the t-bar 1110 and the third segment 930 into a sliding engagement position.

This configuration enables long dimensioned items, such as strips of lumber, metal or vinyl for example, to be supported in lengths exceeding that which could be supported and carried by the cargo bed alone. The t-bar 1110 includes a second sliding portion 1120 that is configured to slide into the first portion and to adjust a vertical height position of the t-bar 1110 and to lock the vertical height position via adjustment holes 1126.

FIG. 11B illustrates a rear view of the t-bar accessory of FIG. 11A. As shown, the t-bar 1110 can be further adjusted to set its overall horizontal length and adjusted so that clearance is available either on its right or left side to load/remove items into and out of the cargo bed that are not being supported by the t-bar 1110. As shown, one side 1110a (currently shown on left hand side from this viewing perspective) of the t-bar 1110 can be slid into its other side 1110b (currently shown on right hand side from this viewing perspective) to provide access to the cargo bed on its left side while the t-bar supports various items resting onto the right hand side of the cargo bed. Further, the entire t-bar 1110 can be rotated 180 degrees so that what is shown from this perspective view on the right hand side and on the left hand side are reversed, so that access to the cargo bed can be made available on the right hand side while the t-bar 1110 supports various items resting onto the left hand side of the cargo bed.

FIG. 11C illustrates a side view of the lower support structure 900 that is configured so that its third segment 930 is oriented into a vertical position without an attached deck 1070. When not being employed for extending a floor of the cargo bed, the third segment 930 can be oriented into a vertical position with or without an attached deck 1030. Accessories are also attachable to the third segment 930 while being vertically oriented as shown.

FIGS. 11D-11E illustrate a side view of the lower support structure 900 that is oriented into a vertical position with an attached t-bar 1110 accessory positioned above a tailgate (access door) 1114 to a cargo bed 1116 of a vehicle. In this configuration, the t-bar 1110 can protect a tail gate 1114 from physical contact with items being supported by the t-bar 1110. Furthermore, the tail gate 1114 can be opened or closed while the t-bar 1110 is in use. The tail gate 1114 is shown as being closed in FIG. 11D and shown as being opened in FIG. 11E.

FIG. 11F illustrates a side view of the lower support structure 900 that is oriented into a vertical position with an attached bicycle rack accessory 1120. As shown, the bicycle rack accessory 1120 is physically attached to the third segment 930 of the lower support structure 900, while the third segment 930 is not attached to the deck 170, 1070. The bicycle rack 1120 extends away from a rear side of the cargo bed 1116 and enables support of a plurality of bicycles while the cargo bed 1116 can be used to carry other items.

FIG. 11G illustrates a side view of the lower support structure 900 that is oriented into a horizontal position supporting a cargo bag accessory 1124 and supporting another second embodiment of an attached bicycle rack accessory 1130. As shown, the cargo bag 1124 is supported on a deck 170, 1070 at a location between the cargo bed 1116 and another second embodiment of a bicycle rack assembly 1130.

The second embodiment of the bicycle rack assembly 1130 includes a smaller dimensioned (1.25 inch) metal tube 1132 that inserts into a larger dimensioned hollow tube 1134 that has a square cross-section, like the segments 110, 120 and 130 and that is located on a bottom side of the deck 1070. The deck 170 is supporting the cargo bag 1124.

In one embodiment, the (female) hollow tube 1134 is actually the third segment 930 with a welded interior metal bar like the metal bar 212 of FIG. 2A to provide add structural material to bore threaded adjustment holes like the threaded holes 112a-112d of FIG. 2A. In this embodiment, the cavity within the third segment would be 1.5 inches high and 1.5 inches wide minus the 3/16 inch width metal bar, yielding 1 plus 5/16 inch width cavity for which to insert the smaller dimensioned tube 1132. In another embodiment, the hollow tube 1134 is a separate structural segment apart from the third segment 930 supporting the deck 170, 1070. Regardless, the adjustment holes employed within the (female) hollow tube 1134 and the adjustment holes of the smaller dimensioned tube 1132 are together slide adjusted, aligned and locked using the same technique employing at least one threaded adjustment hole as described with respect to the first embodiment of the lower support unit and in association with FIG. 2A, in order to minimize and/or eliminate vibration and wobble.

FIG. 11H illustrates a side view of the lower support structure 900 that is oriented into a vertical position with an attached rack 1140 for supporting carpet or linoleum. As shown, the rack 1140 is configured to slide over and physically attach to the third segment 930 of the lower support structure 900, while the third segment 930 is not attached to the deck 170, 1070. The rack 1140 extends partially above the cargo bed 1116 and is located above the lower support unit 900. In some embodiments, the rack 1140 spans horizontally (perpendicular to the direction of gravity) about 8 feet parallel to a direction of movement of the vehicle and about 4 feet in depth perpendicular to a direction of movement of the vehicle. In some embodiments the rack is made from aluminum and includes straps 1142a-1142b that are configured to secure an object, such as a roll of vinyl flooring or carpeting.

FIG. 11I illustrates a side view of the lower support structure 900 that is oriented into a vertical position with an attached rack 1150 for supporting an item such as a kayak, for example. As shown, the rack 1150 is configured to slide over and physically attach to the third segment 930 of the lower support structure 900, while the third segment 930 is not attached to the deck 170. The rack 1150 partially extends above the cargo bed 1116 and is located above the lower support unit 900. In some embodiments the rack is made from aluminum and includes straps 1152a-1152b that are configured to secure an object, such as a kayak.

FIG. 11J illustrates a metal plate 1160 that can be installed onto the deck 1070 to better distribute loads to be carried by the deck 1070. In this embodiment, the plate is made from 1/4 inch thick aluminum and is attached via fasteners 1162 as shown.

Figure 11K:
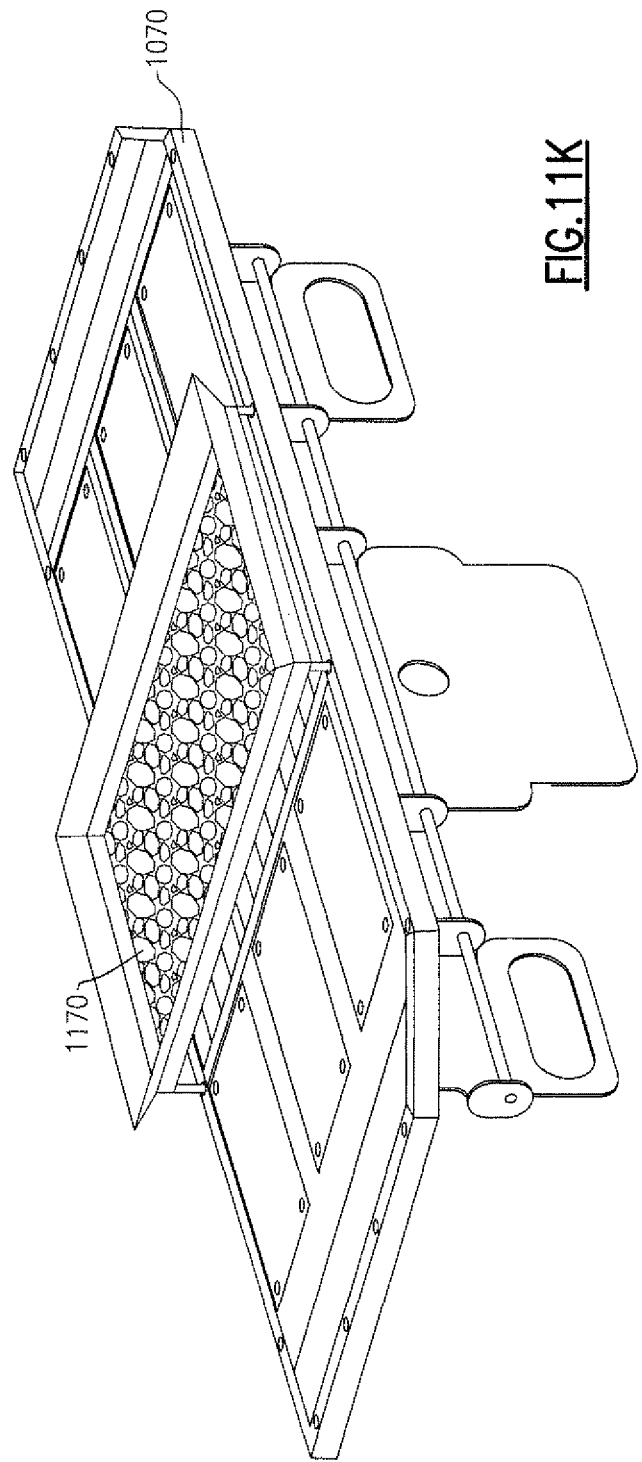

FIG. 11K illustrates a barbeque grill 1170 that can be installed attached onto the deck 1070 for cooking food on the deck 1070.

This written description employs examples to disclose embodiments of the invention, and also to enable a person skilled in the art to practice the invention, including making and using any devices or systems and performing any incorporated methods.

PARTS LIST

100 lower support unit
110 first segment of apparatus 100
110*a* first end of first segment 110
110*b* second end of first segment 110
110*c* joint between horizontal portion 111*a* and non-horizontal portion 111*b*
111*a* horizontal portion of first segment 110
111*b* non-horizontal portion of first segment 110
112*a*-112*d* threaded adjustment holes of horizontal portion 111*a* of first segment 110
114*a*-114*c* adjustment holes of non-horizontal portion 111*b* of first segment 110
116*a*-116*b* adjustment holes of second segment 120
118*a*-118*d* adjustment holes of third segment 130
120 second segment
120*a* first end of second segment 120
120*b* second end of second segment 120
130 third segment, deck support unit
130*a* first end of third segment 130
130*b* second end of third segment 130
140 hinge mechanism
142*a* interior angle of hinge mechanism 140
142*b* exterior angle of hinge mechanism 140
144 clevis pin
144*x* adjustment pin
144*a*-144*b* adjustment holes of clevis pin 144
146*a*-146*b* hinge angle adjustment holes
148*a*-148*b* first and second pins
150 first axis
162*a*-162*d* non threaded adjustment holes of horizontal 111*a* portion of first segment 110
170 deck
210 metal tube
212 metal bar
218 cavity cross-section
230 vehicle hitch
232*a*-232*b* unthreaded hole of vehicle hitch 230
262*a*-262*b* unthreaded hole of vehicle hitch 230
311*a* length of horizontal portion 111*a* of first segment 110
311*b* length of non-horizontal portion 111*b* of first segment 110
320 length of second segment 120
330 length of third segment 130
432*a*-432*b* beveled corners
482 length of a front edge of the deck 170
486 length of a rear edge of the deck 170
488*a* length of distance from the rear edge to the font edge of deck 170
488*b* length 488*b* of a left side edge of the deck 170
530 lower support unit engagement member
532 front safety rail
536 rear safety rail
538*a* right side safety rail
538*b* left side safety rail
584*a*-584*b* traffic signaling lights
818 adjustment hole 818 of the lower support unit engagement member 530
900 second embodiment of a lower support unit apparatus
910 first segment of second embodiment
912*a*-912*e* adjustment holes
914*a*-914*c* adjustment holes
916*a*-916*e* adjustment holes
918*a*-918*f* adjustment holes
920 second segment
930 third segment of second embodiment
940*a*-940*f* adjustment holes
944 adjustment plate
1032 removable rear side rail of deck 1070
1036 removable rear side rail of deck 1070
1038*a* removable right side rail of deck 1070
1038*b* removable left side rail of deck 1070
1040 stationary plate
1042 direction of rotation
1044 direction of rotation
1048 circular shaped plate
1048*a*-1048*b* plurality of holes
1050 fence
1052 metal sleeve
1052*a* bushing
1052*b* bottom portion of the bushing
1054 rubber o-ring
1070 deck
1072 perimeter segment
1080 rotatable shaft
1084*a* left tail light support fixture
1084*b* right tail light support fixture
1086 license plate support fixture
1110 t-bar accessory
1110*a* one side of t-bar accessory
1110*b* other side of t-bar accessory
1112 horizontal adjustment holes of t-bar accessory
1114 tail gate
1116 cargo bed
1118 vertical portion of t-bar
1118*a* vertical adjustment holes of t-bar accessory
1120 bicycle rack
1124 cargo bag
1130 second embodiment of a bicycle rack assembly
1132 smaller dimensioned tube
1134 larger dimensioned (female) hollow tube
1140 rack for rolled flooring
1142*a*-1142*b* straps for rolled flooring
1150 rack for kayak
1152*a*-1152*b* straps for kayak
1160 metal plate
1162*a*-1162*b* fasteners
1170 barbeque grill

What is claimed is:

1. An apparatus for attachment to a vehicle including a cargo bed structure, the apparatus including:
an adjustable support structure having a first segment, a second segment and a third segment,
said first segment having a first end and a second end, said first end being attachable to a hitch that is fixedly attached to a vehicle; and wherein said second end is attached to said second segment; and wherein said second segment is attached to said third segment via a hinge; and where
said first end of said first segment slidably engages said hitch along a first axis, and wherein a sliding position of said first segment relative to said hitch is lockable along said first axis; and wherein said second segment having a first end and a second end, in which said first end of said second segment slidably engages said second end of said first segment along a second axis, said second axis being angled relative to said first axis; and wherein a sliding position of said first end of said second segment relative to said second end of said first segment is lockable along said second axis; and wherein said second end of said second segment is attached to said hinge, said hinge having a first end and a second end and wherein said first end of said hinge is attached to a second end of said second segment and said second end of said hinge being attached to said third segment, and wherein an angle of attachment of said hinge between said second segment and said third segment is adjustable and lockable via a link that attaches to said second segment and to said third segment.

2. The apparatus of claim 1 wherein a metal plate is attached along an inside surface of a wall of at least one of said first segment and said second segment, and wherein threaded holes are extended through said plate and through said wall to enable a pressing engagement between at least one of said first segment and said second segment, and another portion of said apparatus or vehicle.

3. The apparatus of claim 1 wherein said link attaches said second segment and said third segment proximate to an interior side of said angle of attachment.

4. The apparatus of claim 1 wherein third segment is designed to make physical contact with or attach to another object.

5. The apparatus of claim 1 wherein said hinge is designed to orient and lock said third segment into multiple angles of orientation ranging between a horizontal angle of orientation and a vertical angle of orientation.

6. The apparatus of claim 1 wherein said third segment is attached to a deck.

7. The apparatus of claim 6 wherein said deck has at least one of removable side rails, and at least one support fixture for a license plate or a tail light that are each configured to rotate and be oriented in a vertical direction when said deck is oriented in a vertical or horizontal direction.

8. The apparatus of claim 1 wherein said support structure is designed to support a substantial load of 500 pounds or greater upon said third segment.

9. The apparatus of claim 1 wherein said support structure is configurable so that it is located sufficiently far away from a tailgate of a vehicle to allow said tailgate to be opened or closed while said support structure is in use.

10. The apparatus of claim 1 including a ball hitch that is attached to a distal end of said first segment.

11. An apparatus for attachment to a vehicle including a cargo bed structure and a tail gate, the apparatus including:
an adjustable support structure having a first segment, a second segment and a third segment,
said first segment having a first end and a second end, said first end being attachable to a hitch that is fixedly attached to a vehicle; and wherein said second end is attached to said second segment; and wherein said second segment is attached to said third segment via a hinge; and where
said first end of said first segment engages said hitch along a first axis, and wherein
said second segment having a first end and a second end, in which said first end of said second segment slidably engages said second end of said first segment along a second axis, said second axis being angled relative to said first axis; and wherein a sliding position of said first end of said second segment relative to said second end of said first segment is lockable along said second axis; and wherein a metal plate is attached along an inside surface of a wall of at least one of said first segment and said second segment, and wherein threaded holes are extended through at least one of said plate and said wall to enable a pressing engagement between at least one of said first segment and said second segment, and against another portion of said apparatus or vehicle; and wherein said hinge between said second segment and said third segment is adjustable and lockable within a range of lengths, via a link that attaches to said second segment and said third segment.

12. The apparatus of claim 11 wherein said support structure is configurable so that it is located sufficiently far away from a tailgate of a vehicle to allow said tailgate to be opened or closed while said support structure is in use.

13. The apparatus of claim 11 wherein said hinge is designed to orient and lock said third segment into multiple angles of orientation ranging between a horizontal angle of orientation and a vertical angle of orientation.

14. The apparatus of claim 11 wherein an end of said third segment is designed to attach to a variety of attachments including at least one of a t-bar, a carpet rack, a canoe rack or a bicycle rack.

15. The apparatus of claim 11 wherein said third segment is designed to attach to a deck.

16. The apparatus of claim 15 wherein said deck is designed to be attached to barbeque grill.

17. The apparatus of claim 11 wherein said support structure is designed to support a substantial load of 500 pounds or greater upon said third segment while said support structure is in use.

18. The apparatus of claim 11, said link attaches said second segment and said third segment proximate to an interior side of an angle of attachment.

19. The apparatus of claim 11, wherein said metal plate is attached along an inside surface of a wall along said diagonal axis of said first segment and wherein threaded holes are extended through said plate and said wall to enable a pressing engagement between said second segment and said first segment.

20. The apparatus of claim 17 including a ball hitch that is attached to a distal end of said first segment.

21. An apparatus for attachment to a vehicle including a cargo bed structure and a tail gate, the apparatus including:
a support structure including, a first segment for attaching to a hitch of a vehicle; and including
a second segment including a hinge for attaching to a third segment;
said third segment for attaching to said hinge; and wherein
said first segment and said second segment are joined via an overlapped attachment along a diagonal axis, said attachment configured to adjust a length of overlap to provide for an adjustment of a location of said hinge; and wherein
said support structure is designed to support a substantial load of 500 pounds or greater upon said third segment while said support structure is in use; and wherein
said hinge is designed orient and lock said third segment into multiple angles of orientation ranging between a horizontal angle of orientation and a vertical angle of orientation, and wherein said angles of orientation are adjustable and lockable via a link that attaches to said second segment and to said third segment.

22. The apparatus of claim 21, wherein a metal plate is attached along an inside surface of a wall of at least one of said first segment and said second segment, and wherein threaded holes are extended through said metal plate and through said wall to facilitate a pressing engagement between at least one of said first segment and said second segment, and another portion of said apparatus or said vehicle.

23. The apparatus of claim 21, wherein where said first segment is in a sliding engagement with said hitch, and wherein said first segment is in a sliding engagement with said second segment, and where at least one sliding position of said sliding engagements, is locked via engaging a threaded fastener through at least one of said threaded holes, said at least one of said threaded holes being disposed through at least one wall of an inner segment of at least one sliding engagement.

24. The apparatus of claim 23 wherein the threaded fastener is a bolt of at least ⅝ inches in diameter.

25. The apparatus of claim 21 wherein said support structure is configurable so that it is located sufficiently far away from a tailgate of a vehicle to allow said tailgate to be opened or closed while said support structure is in use.

26. The apparatus of claim 21 wherein third segment is designed to make physical contact with or attach to another object.

27. The apparatus of claim 21 wherein said third segment is designed to attach to a deck.

28. The apparatus of claim 21 wherein said third segment is designed to be attached to a barbeque grill.

29. The apparatus of claim 21 wherein said third segment is designed to attach to each of a variety of attachments including at least one of a t-bar, a carpet rack, a kayak rack or a bicycle rack.

30. The apparatus of claim 27 wherein said deck has at least one of a support fixture for a license plate or a support fixture for a tail light, that are each configured to rotate and to be oriented in a vertical direction when said deck is oriented in a vertical or horizontal direction.

31. The apparatus of claim 21 including a ball hitch that is attached to a distal end of said first segment.

* * * * *